United States Patent [19]
Accad

[11] Patent Number: 5,982,937
[45] Date of Patent: Nov. 9, 1999

[54] APPARATUS AND METHOD FOR HYBRID COMPRESSION OF RASTER DATA

[75] Inventor: Yigal Accad, Millbrae, Calif.

[73] Assignee: Electronics for Imaging, Inc., Foster City, Calif.

[21] Appl. No.: 08/773,656

[22] Filed: Dec. 24, 1996

[51] Int. Cl.⁶ .................................................. G06T 9/00
[52] U.S. Cl. .......................................... 382/239; 382/166
[58] Field of Search .................................... 358/430, 539; 382/166, 239, 243

[56] References Cited

U.S. PATENT DOCUMENTS

| 5,151,949 | 9/1992 | Miyata ........................................ 382/9 |
| 5,479,587 | 12/1995 | Campbell et al. ...................... 395/116 |
| 5,796,864 | 8/1998 | Callahan ................................. 382/166 |

FOREIGN PATENT DOCUMENTS

| 0286286 | 10/1988 | European Pat. Off. . |
| 0597571 | 8/1993 | European Pat. Off. . |
| 0691784 | 1/1996 | European Pat. Off. . |
| 0712088 | 5/1996 | European Pat. Off. . |
| 06153172 | 5/1994 | Japan . |
| 9615620 | 5/1996 | WIPO . |

OTHER PUBLICATIONS

Search Report mailed on Apr. 15, 1998.

*Primary Examiner*—Thomas D Lee
*Assistant Examiner*—Stephen Brinich
*Attorney, Agent, or Firm*—Majestic, Parsons, Siebert & Hsue P.C.

[57] ABSTRACT

From a raster page, patches of connected pixels of the same color are identified. Patches of at least a predetermined sized, typically corresponding to text or line art objects, are subjected to a lossless compression. Patches below the predetermined size, typically corresponding to image or photo objects, are substantially subjected to a lossy compression. The patch predetermined size controls the mix of lossless and lossy compression procedures. Optimum compression is achieved by maximizing the lossless compression while attaining a targeted compression ratio. Various features include efficient recognition and encoding of patches, refined treatment of the boundaries between the lossless- and the lossy-compressed pixels, adaptive compression ratio control, and fail-safe compression provisions.

60 Claims, 8 Drawing Sheets

RUN LENGTH CODING

| TYPE-CODE (4 bit) | + PARAMETER | Total Bits | FUNCTION | RUN LENGTH CONFIGURATION |
|---|---|---|---|---|
| 0 | 32 bit color | 36 | $p(i,j)$ = arbitrary color |  |
| 1 | 4 bit index | 8 | $p(i,j)$ = palette color |  |
| 2 | NONE (run length r = 1) | 4 | $p(i,j) = p(i,j-1)$ |  |
| 3 | 4 or 20 bits run length r = R | 8 - 24 | $p(i,k) = p(i,j-1)$ $j <= k < j+R$ |  |
| 4 | NONE (run length r = 1) | 4 | $p(i,j) = p(i-1,j)$ |  |
| 5 | 4 or 20 bits run length r = R | 8 - 24 | $p(i,k) = p(i-1,k)$ $j <= k < j+R$ |  |
| 6 | NONE (run length r = 1) | 4 | $p(i,j) = p(i-1,j-1)$ |  |
| 7 | 4 or 20 bits run length r = R | 8 - 24 | $p(i,k) = p(i-1,j-1)$ $j <= k < j+R$ | 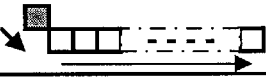 |
| 8 | NONE (run length r = 1) | 4 | $p(i,j) = p(i-1,j+1)$ |  |
| 9 | 4 or 20 bits run length r = R | 8 - 24 | $p(i,k) = p(i-1,j+R)$ $j <= k < j+R$ |  |
| 10 | | | Reserved | |
| 11 | 4 or 20 bits run length r = R | 8 - 24 | $p(i,k) = p(i-1,j)$ $j <= k < j+R$ | 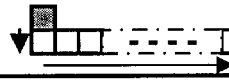 |
| 12 | | | Reserved | |
| 13 | 4 or 20 bits run length r = R | 8 - 24 | $p(i,k) = p(i-1,j+R-1)$ $j <= k < j+R$ | 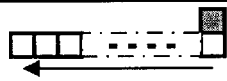 |
| 14 | NONE (run length r = 1) | 4 | $p(i,j)$ = transparent $= t2(i,j)$ |  |
| 15 | 4 or 20 bits run length r = R | 8 - 24 | $p(i,k)$ = transparent $= t(i,k)$ $j <= k < j+R$ | 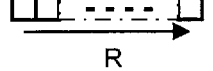 |

*FIG. 6*

APPARATUS AND METHOD FOR HYBRID COMPRESSION OF RASTER DATA

BACKGROUND OF THE INVENTION

This invention relates generally to compression and decompression of data, and more particularly to determining different types of structures that may exist in rasterized data and selectively applying appropriate compression schemes thereto.

In a display-oriented environment, pictorial data is presented in a two-dimensional page representation. A page is typically composed by a user on a workstation with the aid of a desktop publishing application. The page may contain text, line art (also called "graphic") and image (e.g., photo) objects and is usually output by the desktop publishing application in the form of a page description file as specified by a page description language (PDL). Before a page can be rendered by a rendering device such as a printer or a display screen, the data must be presented to the rendering device in the form of a rasterized page. The conversion to a rasterized form is accomplished by a PDL interpreter specific to the PDL used.

A rasterized page is a digital representation of a page by means of a two-dimensional array of pixels, with each pixel assuming a particular color. The color has a range depending on the number of bits assigned to each pixel, with a larger number of bits producing a higher color resolution (color depth). In printer applications, it is expedient to classify the colors into four components corresponding to four basic inks: cyan (C), magenta (M), yellow (Y), and black (K). For example, commercial applications typically has a color resolution obtained from using 8 bits (byte) of storage assigned to each color component so that each pixel has 4 bytes associated with it. This will produce approximately 4 billion ink combinations.

Printers, particularly laser printers, typically have a print engine that prints at a constant rate. Raster data must be fed to the print engine at a rate commensurate with the output rate or else a printer overrun error will occur. At the very least, the print engine can not be made to wait for raster data in the course of outputting a page. Thus, to accommodate the incompatibility between input data rate and print engine output rate, a print buffer (also referred to as a frame buffer) is employed to accommodate at least one rasterized page at a time.

The two-dimensional nature of a rasterized page results in the memory needed to store the page increasing as the square of the resolution and/or the product of the linear dimensions of the page. For example, for a modest printer resolution, such as 400 dpi (dots per inches) (i.e., 157 dots per cm) as applied to a page 8.5 inches by 11 inches (i.e., 21.6×27.9 cm) in size, the memory required for a page amounts to as much as 60 Mbytes (megabytes). With the high cost of memory, this amount of memory could easily cost more than the sum of all other parts of a laser printer, and would not be commercially or economically viable.

One common solution to minimize the size of the print buffer is to compress the raster data before storing in it. Once one or more pages of compressed raster data have been stored, they can be decompressed at a controlled rate appropriate for the print engine.

U.S. Pat. No. 5,479,587 discloses a print buffer minimization method in which the raster data is compressed by trying different compression procedures with increasing compression ratios until the raster data is compressed sufficiently to fit in a given print buffer. Each time, a compression procedure with a higher compression ratio is selected from a predefined repertoire of such procedures, ranging from lossless ones such as run-length encoding to lossy ones. Generally, lossless encoding is efficient on text and line art data while lossy encoding is effective on image data. However, this method may produce poor print quality when the nature of the raster page calls for lossy compression in order to achieve a predetermined compression ratio. This is because only one of the selected compression procedure is summarily applied across each strip of the page and when the strip contains both image data as well as text or line art data, the lossy compression procedure will generally blur sharp lines that usually delineate text or line art data or may introduce undesirable artifacts.

European Patent Publication No. 0597571 discloses a method in which the types of objects in a page are first extracted and the boundary of each object determined before rasterization. Appropriate compression procedures are selectively applied to each type of objects. In this way, lossless compression procedures may optimally be applied to text or line art objects while lossy compression procedures may be applied to image objects. Essentially, the method operates at the display list level which is an intermediate form between the page description file and the rasterized page. Objects and their types are determined by parsing from the high-level, implicitly object-defining commands of the PDL in the display list. This requires knowledge of the particular brand and version of PDL commands as well as how to reconstruct a certain object from these implicit manifestations. In any case, it appears all but the simplest boundaries such as objects enclosed in rectangular blocks are practically determinable from such deciphering at the display list level.

In general, the display list is interpreted by a specific PDL interpreter to generate raster data in page representation. The interpretation process is likened to a "black box" in which the display list is input at one end and out comes the raster data at the other end. Once the data is rasterized, it is in the form of an array of pixels or a bit map, and there are no longer any explicit and well defined objects to which individual compression procedure can be applied.

OBJECTS AND SUMMARY OF THE INVENTION

Accordingly, it is a general object of the present invention to provide a method and apparatus for optimum data compression of raster data with a minimum of data degradation.

It is another object of the present invention to determine the different types of structures that may exist in already rasterized data and selectively applying appropriate compression procedures thereto.

It is another object of the present invention to minimize the memory requirement for a print or frame buffer.

It is another object of the present invention to prescribe, given a desired compression ratio, how to balance between lossless and lossy compression procedures (as well as to control the amount of lossiness) such that compression to at least the desired ratio is achieved.

These and additional objects are accomplished by the following features of the invention.

The invention seeks to apply optimum compression procedures to different types of objects that may exist on a page. A first type of compression such as lossless, run-length encoding is preferably applied to data that is recognized as text or line art. However, the first type of compression may not be efficient when applied to data that is recognized as image or photo. In order to meet a targeted compression ratio, a second type of compression such as transform encoding is preferably applied to these type of data. In the preferred embodiment the transform encoding is a lossy JPEG encoding which is applied to integral blocks of 8×8 pixels. However, once a page has been converted from the page description file to rasterized page data, all history information regarding type and source of the various objects comprising the page is lost.

One important feature of the present invention is the ability to analyze the page in the rasterized form. This is accomplished by recognizing structures in the raster data in the form of color patches. A patch is regarded as a spread of connected pixels of the same color. Once the patches are recognized, they are discriminated between a Type 1 or a Type 2 patch, depending on whether or not the patch can be efficiently compressed by the first type of compression procedure. Each patch has a size measured by the number of pixels therein ("PatchPixelCount"). Type 1 patch has a PatchPixelCount greater or equal to a predetermined number, D1, and Type 2 patch has a PatchPixelCount less than D1. In a preferred implementation, D1 is from 6 to 8. The first compression procedure is then applied to Type 1 patches and the second compression procedure is applied to Type 2 patches.

Thus, even in rasterized form, text or line art objects can generally be recognized and distinguished from image or photo objects. Appropriate compression procedures can then be applied to each type of data to optimally attain efficient compression while maintaining quality.

According to another feature of the present invention, provision is made for handling the arbitrary boundary between the two types of patches. The original raster data has a granularity at the pixel level. However, the preferred second compression procedure, block-oriented JPEG compression, coarsens the granularity of Type 2 data to the block level (8×8 pixels) which is larger by an area ratio of 64:1 compared to that of Type 1 data associated with Type 1 patches. The mismatch in granularity between the two types results in a discontinuity at the boundary between Type 2 and Type 1 data. This problem is handled by coding the Type 2 patches also in their original pixel granularity as transparent pixels. Later, when the document is reconstructed, the transparent pixels form one or more windows for the decompressed Type 2 data to show through in the reconstructed document, thereby preserving the original fine structure at the boundary between Type 1 and Type 2 data.

Also at the boundary, there will be JPEG blocks that are only partially filled with Type 2 patches. When JPEG compression is applied to such blocks, their unnatural and discontinuous structure causes the introduction of undesirable frequencies which tend to decrease the compression ratio. To reduce this effect, before applying the compression the pixel values in the unfilled portion of the block are replaced by the average value of the Type 2 pixels in the block.

In a preferred embodiment, a patch recognizer scans the pixels within a working window row by row, and pixel by pixel within each row, and recognizes the patches. After the patches are parsed out, they are separated into Type 1 and Type 2 patches by a patch type discriminator. A first compressor compresses Type 1 pixels from Type 1 patches as well as transparent pixels representing the position of Type 2 pixels from Type 2 patches. A second compressor compresses Type 2 pixels block by block. The two types of compressed codes are stored individually in a compressed page buffer. These are decompressed respectively by a first and second decompressor before being merged to become the reconstructed document.

One feature in an alternative embodiment is that the first compressor in a first pass also assumes the role of the patch recognizer. In the first pass, the first compressor applies run-length encoding (RLE) to all raster data. Since the RLE represents a run or spread of pixels with the same color, patches are therefore identified as an integral part of the RLE process. This feature is efficient because the processes of Type 1 compression and patch recognition are combined into one.

According to another feature in the alternative embodiment, a threshold is set for deciding whether a block is to be JPEG compressed. If a block (8×8 pixels) has only a small number of Type 2 pixels (i.e. BlockP2Count is less than a predetermined threshold), it will not be cost effective to perform also the JPEG compression on that block. Instead, all data in the block will be treated as Type 1. In a preferred implementation, this is accomplished by an in-block counter.

According to another aspect of the invention, during the compression procedures, the compression ratio achieved to-date is monitored after the completion of each strip (row of blocks) and a set of compression parameters is adaptively changed in order to attain the required compression ratio for the whole page. A number of parameters affects the compression ratio and this includes the Q_factor parameter applied to the quantization matrices in the JPEG encoding. In a preferred embodiment, the Q_factor is allowed to change adaptively to maintain the best image quality within the required compression ratio. In a preferred implementation, this is accomplished by an adaptive compression ratio controller.

According to another aspect of the invention, a recompression procedure is implemented in the rare event that the required compression ratio is not attained. A set of parameters associated with compression ratio is adjusted. The compressed document is decoded portion by portion using the previous set of parameters and recompressed using the updated set of parameters.

Additional objects, features and advantages of the present invention will be understood from the following description of the preferred embodiments, which description should be taken in conjunction with the accompanying drawings.

BRIEF DESCRIPTION OF THE DRAWINGS

FIG. 6 is a table listing a schedule of run-length codes according to a preferred embodiment of the invention.

FIG. 8b shows a continuation of the flow diagram that begins in FIG. 8a.

DETAILED DESCRIPTION OF THE PREFERRED EMBODIMENTS

Figure 1:
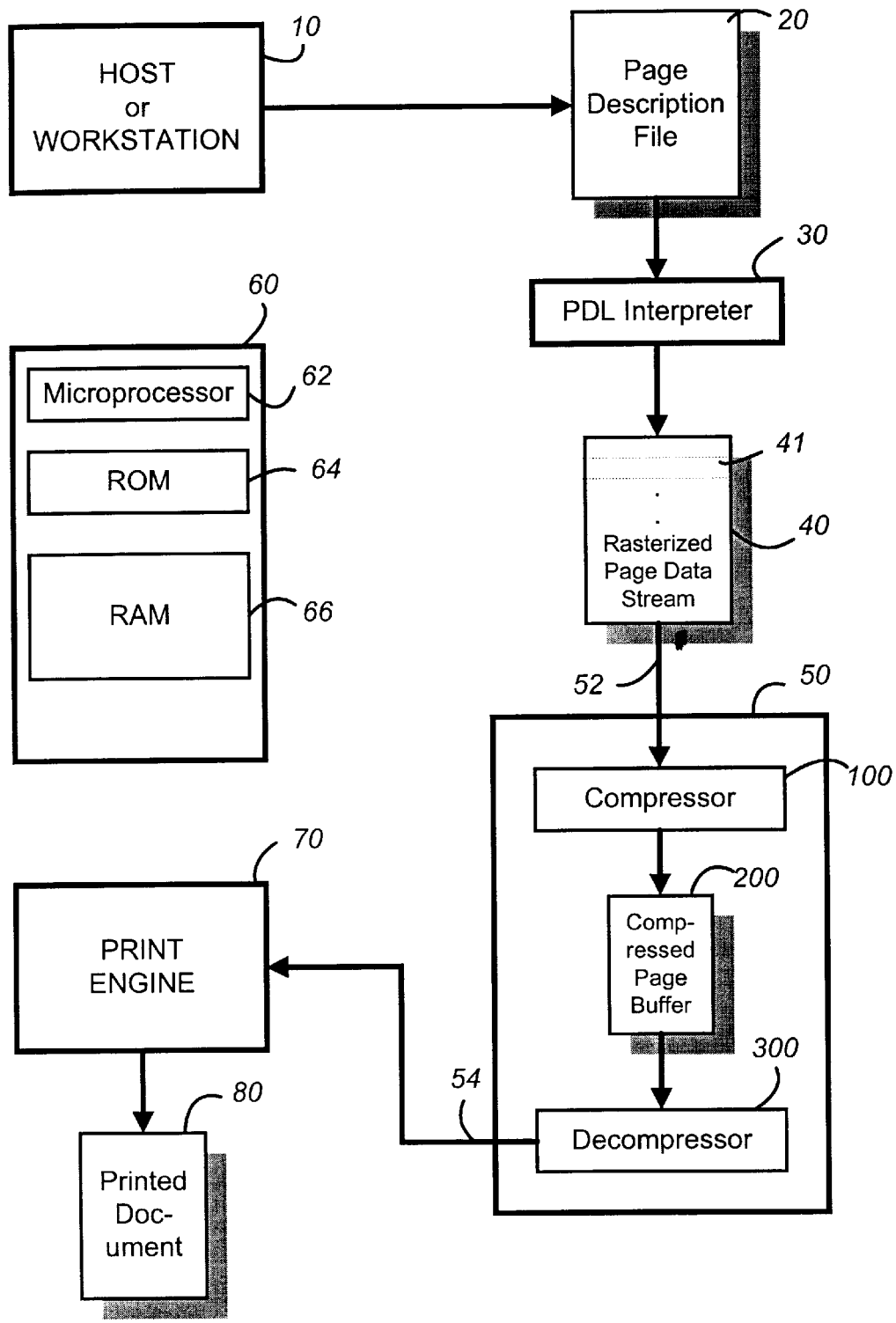
FIG. 1 is a schematic system block diagram illustrating a typical environment in which the present invention is applicable.

FIG. 1 is a schematic system block diagram illustrating a typical environment in which the present invention is applicable. A host computer or workstation 10 running a desktop publishing application program is used to generate page-oriented documents which are ultimately rendered in printed form or displayed on a screen. To be specific, disclosure will be made with reference to a printer application, although it will be understood other types of rendering applications such as plotters, facsimile machines, and display screens are also applicable.

A page-oriented document generated by the host computer or workstation 10 may typically contain a mixture of text, line art (alternatively known as "graphic") and image objects. These and other contents are specified by a page description language (PDL) and the document is output as a page description file 20. A PDL interpreter 30 specific to the particular PDL used interprets the page description file and generates the document page by page in bit map format, as represented schematically by a rasterized page data stream 40. A generalized page memory 50 receives the rasterized data through an input 52 and relates it via an output 54 to a print engine 70. Since the print engine 70 typically prints page by page, the generalized page memory 50 serves to collect one or more pages of the document before sending it to the print engine 70. As the rate of the rasterized data produced from the PDL interpreter 30 is generally different from the intake rate of the print engine 70, the generalized page memory 50 also serves to buffer the two dissimilar rates by providing temporary storage.

As described earlier, a page of rasterized data may require tens to hundreds of megabyte of memory for storage and is therefore impractical to store in uncompressed form. To this end, the generalized page memory 50 includes a compressor 100 which receives and compresses the rasterized page data stream 40 a portion at a time, such as a strip 41. The compressed raster data is stored in a compressed page buffer 200. Later, it is retrieved from the compressed page buffer 200 and is decompressed by a decompressor 300 before being fed to the print engine 70 to output a printed document 80 page by page. In this way, the memory requirement of the generalized page memory is reduced by the same ratio as the compression ratio achieved in the compression process.

In practice, the PDL interpreter 30, and the generalized page memory 200 form part of a printer controller that operates with the print engine 70. The PDL interpreter 30, the compressor 100 and the decompressor 300 can be implemented either as dedicated hardware processors or as part of a microprocessor system 60. In the latter case, the microprocessor system 60 includes a microprocessor 62, non-volatile, read-only memory (ROM) 64 and random-access memory (RAM) 66. The functions of the various components are embodied as procedures stored in ROM 64 and are executable by the microprocessor 62. Also, RAM 66 acts as temporary storage for the strip 41 as well as the compressed page buffer 200.

Figure 2:
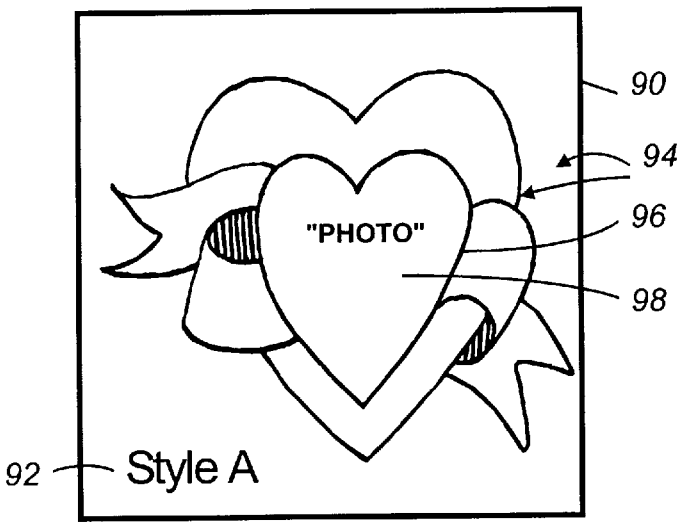
FIG. 2 is an example page containing text, graphic and image objects.

FIG. 2 is an example page containing text, graphic and image objects. Although the discussion refers to a page, it will be understood that the page is in the context of a document which may contain multiple pages. The example shows a page 90 with text 92 at the bottom. It also has Line art 94 consisting of a heart design 96 overlaying a larger heart design with a ribbon interleaved in between. The smaller heart 96 also forms a frame for a photo 98, denoted by "PHOTO" at the center of the page. Even though FIG. 2 is shown schematically in black and white, the various objects may be in color.

When the page 90 is rasterized, it is represented by a two dimensional array of pixels. In the preferred embodiment, each pixel is represented by four bytes, one byte for each of the primary ink colors CMYK. As explained earlier, this will allow each pixel to represent one of about 4 billion ink combinations.

Determination of Structures and their Type from Rasterized Data

Once the page 90 has been converted from the page description file to rasterized page data, all history information regarding type and source of the various objects comprising the page is lost. One important feature of the present invention is the ability to analyze the page in the rasterized form and determine the different structures and their types therein and apply the appropriate compression procedure to each type of structures.

Figure 3:
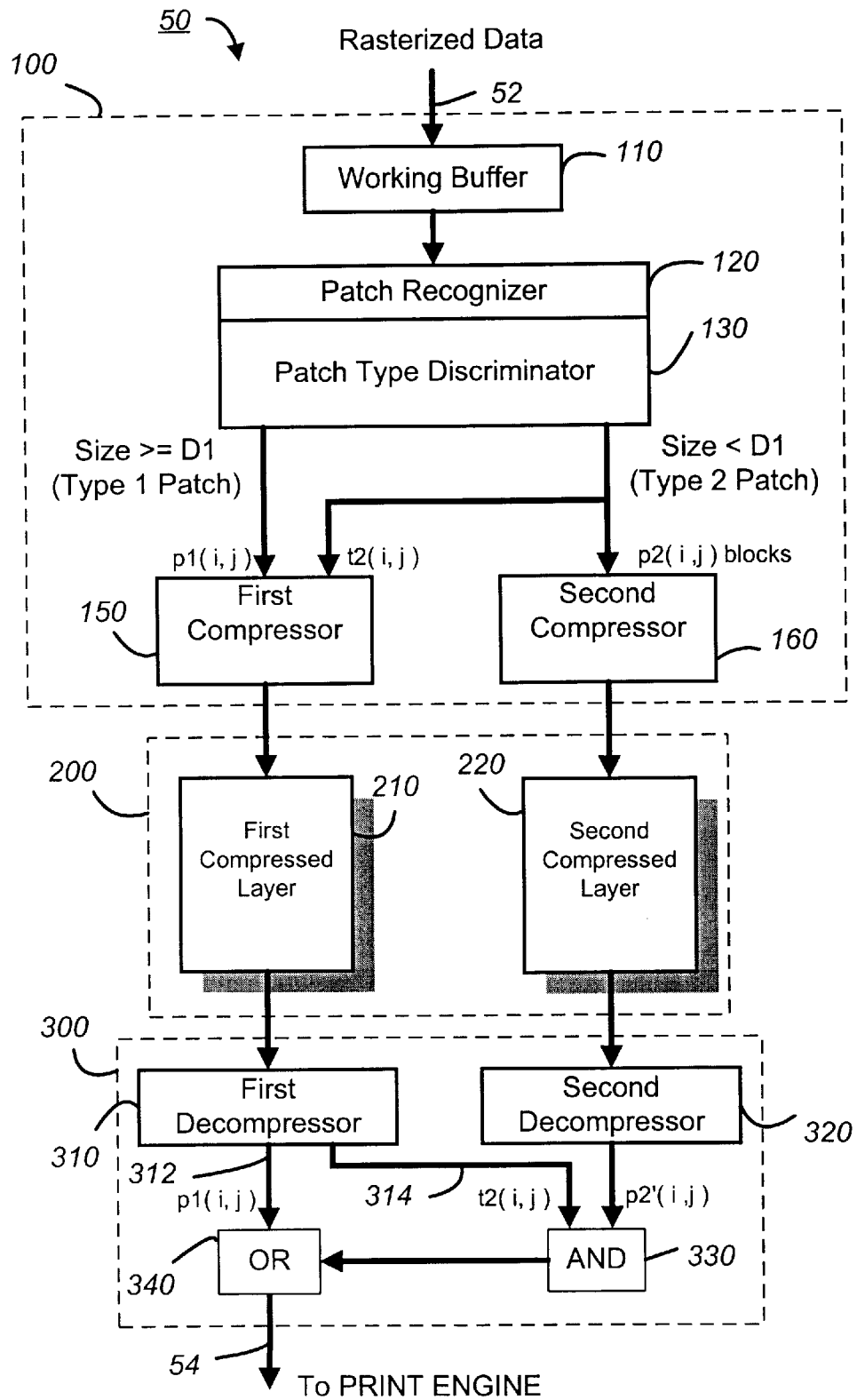
FIG. 3 is a block diagram of the apparatus and method of hybrid compression, according to a preferred embodiment of the invention.

FIG. 3 is a block diagram of the apparatus and method of hybrid compression, according to a preferred embodiment of the invention. Referring also to FIG. 1, the generalized page memory 50 includes the compressor 100, the compressed page buffer 200 and the decompressor 300. The compressor 100 receives rasterized data strip by strip from the input 52 into a working buffer 110. In the preferred embodiment, each strip is 8 rows of pixels amounting to an 8-pixel high working window across the page. A patch recognizer 120 scans the pixels within the working window row by row (from top to bottom of the window) and pixel by pixel within each row (from left to right) and recognizes patches of connected pixels of the same color. Two pixels are connected if they are adjacent each other whether horizontally, vertically or diagonally. As will be explained later, in the preferred embodiment, patches in a strip are recognized after the recognizer 120 has actually scanned through the next strip. Once the patches are recognized, a patch type discriminator 130 discriminates between at least two type of patches by virtue of their size or the number of pixels ("PatchPixelCount") in each patch.

The nature of text or line art objects is such that they are typically made up of color patches of larger size, each having a PatchPixelCount ranging from several to thousands of pixels. A large patch will also be referred to as a Type 1 patch. The pixels in it will be referred to as Type 1 pixels, $p1(i,j)$ where the coordinates $(i,j)$ represents the ith row and jth column of the pixel array of a page. This characteristic of large size color patches means there is low activity or high redundancy in going from one pixel to another and generally yields well to efficient compression by lossless compression procedures.

Image or photo objects, on the other hand, are mainly constituted from color patches of smaller size, each with a PatchPixelCount typically ranging from a single to a few pixels. A small patch will also be referred to as a Type 2 patch and pixels in it as Type 2 pixels, $p2(i,j)$. This characteristic of small size color patches means there is high activity or low redundancy in going from one pixel to another. Generally, as the patch size decreases, lossless compression becomes increasingly inefficient. Indeed, when a patch falls below a certain size, lossless compression may yield a compression ratio of less than one, since the code required for the encoding occupies more space than the patch it seeks to encode. Generally, image objects are more efficiently compressed by a transform coding procedure, particularly a lossy type. This type of compression is termed "lossy" because some information is lost in the compression-decompression cycle. However, for image objects, and even with a compression ratio of 10:1 the loss of information is not readily apparent to the human eye.

The demarcation between a Type 1 (large) patch and a Type 2 (small) patch is respectively whether the number of pixels in a patch, i.e., PatchPixelCount, is equal or greater than a predetermined minimum count ("PatchP1MinCount" or "D1"). In other words, the patch is Type 1 if its PatchPixelCount>=D1, and the patch is Type 2 if its PatchPixelCount<D1. This threshold number, D1, provides a parameter for adjusting the desired proportion of Type 1 and Type 2 compression procedures being applied to a document, where a higher threshold number tends to increase the proportion of Type 2 compression. The parameter D1 is predetermined by consideration of the anticipated nature and particular mix of graphic and image objects on the documents in question and the particular type of lossless and lossy compression procedures to be applied in order to achieve an overall targeted compression ratio. One practical way to determine D1 is to apply selected lossless and lossy compression procedures to representative pages to see which threshold number yields, within the targeted overall compression ratio, a mix that maximizes the proportion of lossless compression. In the preferred embodiment, PatchP1MinCount (D1) is set to a value in the range from 6 to 8.

As described earlier, a working window or a strip 8-pixel high moves strip by strip from top to bottom on the page. However, to allow for the possibility that a patch may fall partially outside the current strip, the counting of the pixels within a patch is delayed until sufficient rows have been considered. This means that the counting could be delayed beyond the current window. Since the predetermined threshold number for patch size is D1, then an extreme-case patch is one where the pixels are stacked up in a column D1 high. Thus, the tallying of the pixels in a patch should include at least D1 rows of pixels from the top of the patch. In the preferred embodiment, D1 is as large as 8 which is a strip height. Thus, the patch recognition is performed on a previous strip after a current strip has been scanned.

Separation into Graphics and Photo Layers

After the patches are parsed out by the patch recognizer 120, they are separated into Type 1 and Type 2 patches by the patch type discriminator 130. Generally, the Type 1 patches will be associated with text or graphic objects and the Type 2 patches will be associated with image objects. The original raster page may be regarded as being separated into a first raster layer containing Type 1 patches and a second raster layer containing Type 2 patches.

Figure 4A:
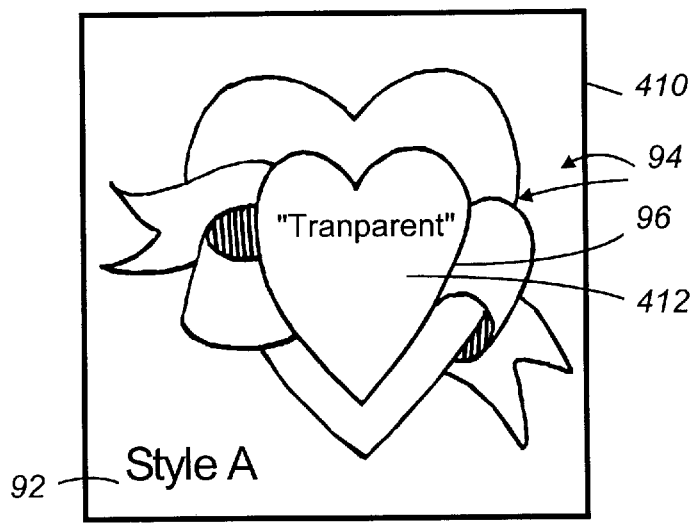
FIG. 4a illustrates the schematic separation of the Type 1 raster data onto a first raster layer.
Figure 4B:
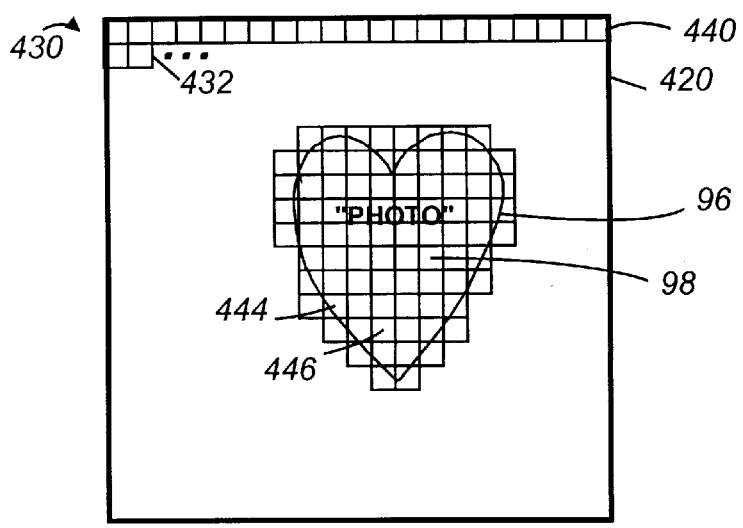
FIG. 4b illustrates the schematic separation of the Type 2 raster data onto a second raster layer.

FIG. 4a and FIG. 4b respectively illustrate the schematic separation of the raster data objects into a first raster layer 410 and a second raster layer 420. The first raster layer 410 collects those pixels that are to be subjected to a first compression procedure and the second raster layer 420 collects those pixels that are to be subjected to a second compression procedure. Using the example page 90 shown in FIG. 2, the Type 1 pixels, p1(i,j) representing mainly graphic objects such as text 92 and line art 94 are retained on the first layer while the Type 2 pixels, p2(i,j) representing mainly the photo 98 in the heart shape frame 96 are separated onto the second layer. At the same time, the position information of the p2(i,j) pixels are preserved on the first layer in the form of transparent pixels t2(i,j) representing a cutout 412. Thus, it is as if all objects originally reside on the first raster layer 410, and then the Type 2 patches associated with the image objects are cut out and placed on the second raster layer 420.

First Compression

Referring back to FIG. 3, the pixels in the Type 1 patches, p1(i,j) are sent to a first compressor 150. The pixels in the Type 2 patches, p2(i,j) are sent to a second compressor 160. At the same time, the coordinates of p2(i,j) are sent to the first compressor where they are treated as transparent pixels t2(i,j). A preferred lossless compression procedure executed by the first compressor 150 is run-length encoding (RLE) in which a color patch is encodable by a starting color pixel and one or more run lengths of pixels having the same color. The RLE compression procedure is applied to both the Type 1 pixels p1(i,j) and the transparent t2(i,j) pixels. The resulting compressed codes are stored in the compressed page buffer 200 as a first compressed layer 210.

Second Compression

A preferred compression procedure executed by the second compressor 160 is a DCT (Discrete Cosine Transform) coding such as JPEG, which is a lossy compression scheme. The JPEG compression procedure is promulgated by the Joint Photographic Experts Group, which is a committee under the International Standards Organization. The JPEG compression is applied to blocks of Type 2 pixels p2(i,j). After the second compressor 160 has performed the compression, the resulting compressed codes are stored in the compressed page buffer 200 as a second compressed layer 220.

The JPEG encoding procedure is well-defined and comprised of the following three steps: (1) DCT (Discrete Cosine Transform) of 8 by 8 pixel blocks to obtain the transform coefficients, (2) quantization of the coefficients, and (3) entropy coding (the default for the JPEG baseline system is the Huffman coding) of the quantized coefficients.

A feature of JPEG is that it operates not on the individual pixel level but on integral blocks of 8 by 8 pixels. To conform to this mode of operation, the second raster layer 420 is schematically partitioned into blocks of 8×8 pixels as shown in FIG. 4b. A grid 430 (not shown fully) of 8 by 8 pixel blocks such as a block 432 is superimposed on the entire page. If the number of rows (or columns) of the page is not a multiple of 8, additional rows (or columns) are appended to the page to satisfy this requirement. These additional rows (or columns) are replications of the last row (or column) of the page.

In the example shown, Type 2 pixels are expected to congregate in the region bounded by the smaller heart 96. Thus, it can be seen that generally three type of blocks can occur: a block with no Type 2 pixels (e.g. block 432) ; a block with partially filled Type 2 pixels (e.g. block 444); and a block with completely filled Type 2 pixels (e.g. block 446).

Each horizontal row of blocks forms a block row such as a block row 440. Standard JPEG operations are applied on the page block row by block row, and within a block row block by block. The two dimensional discrete cosine transform (DCT) is being applied only to blocks which are either completely or partially filled with Type 2 pixels. A block row therefore may contain no blocks or some blocks or all blocks subjected to JPEG encoding. In the standard implementation of JPEG encoding, the DC coefficient of a current block is defined relative to the previous block, thus the sequence of blocks during compression must be the same as that during decompression. All disjointed blocks within a block row are assembled together to form a contiguous chain before they are JPEG encoded.

In the preferred embodiment, the position and type information of the blocks on the page is also coded and stored in compressed form. A 2-bit code classifies the current block row as containing no JPEG blocks, few blocks, many blocks or is completely JPEG encoded. When only 'few' blocks in a block row are JPEG encoded, the positioning information is given by the number of JPEG blocks in the block row followed by a list of their positions within the block row. When 'many' blocks are JPEG encoded, a bit array corresponding to all blocks in the block row is given with the bit for each block turned on or off according to the block being JPEG encoded or not, respectively. The transition between 'few' and 'many' is determined in a way that minimizes the number of bits required for the block positioning information.

According to another aspect of the present invention, provision is made for handling the arbitrary boundary between the two types of data by specific features implemented on both the first and second raster layers 410, 420.

The original raster data has a granularity at the pixel level. However, the block-oriented JPEG compression coarsens the granularity of Type 2 data to the block level which is larger by an area ratio of 64:1 compared to that of Type 1 data. The mismatch in granularity between the two types results in a discontinuity at each boundary between Type 2 and Type 1 data.

On the first raster layer 410, in addition to the Type 1 patches, the positions of the Type 2 patches in their original fine granularity are preserved as transparent pixels t2(i,j). As will be shown later, when a reconstructed document is formed by combining the first and second layers, the transparent pixels forms one or more windows on the first layer to the second layer and only those portions of the second layer in the window will be selected in the combination. Owing to the arbitrary shape of the transparent windows in the first raster layer, not necessarily whole JPEG encoded blocks will show through in the reconstructed document. Thus, while the JPEG compression coarsens Type 2 data from pixel to block granularity, the fine structure at the boundary between Type 1 and Type 2 data is restored in the reconstructed document.

On the second raster layer 420, those blocks such as 444 that are partially filled with Type 2 pixels cover individual regions on the original page that contains a mixture of Type 1 and Type 2 pixels. After separation, the Type 1 patches will end up on the first raster layer 410. The Type 2 patches will end up on the second raster layer 420 in a partially filled block, with the complement to the block being a void originally occupied by the Type 1 patches. However, DCT can not be applied to a block where there are undefined pixels. One possibility is not to remove the Type 1 pixels from the block in the first place so that there will be no void. The disadvantage is that when DCT is applied to a block of mixed types, its unnatural and discontinuous structure causes the introduction of undesirable frequencies which tend to decrease the compression ratio as well as introducing undesirable artifacts. To reduce this effect, before applying DCT the pixel values in the complement region of the block are replaced by the average value of the Type 2 pixels in the block.

Depending on the requirements of the destination device, the JPEG encoded photo data may be interleaved on a basis of a block, block row or the entire page.

The Decompression

Once one or more pages of the document has been stored in compressed form in the compressed print buffer 200, they are ready to be decompressed by the decompressor 300. The decompressor 300 comprises a first decompressor 310 and a second decompressor 320.

The first decompressor 310 decompresses the encoded data stored in the first compressed layer 210 to recover the pixels p1(i,j) and the transparent pixels t2(i,j) that schematically reside on the first raster layer 410. The pixels p1 were from the Type 1 patches and the transparent pixels t2 were from the Type 2 patches representing the void left by the Type 2 patches that had been removed to the second raster layer 420.

The second decompressor 320 decompresses the encoded data stored in the second compressed layer 220 to recover the reconstructed pixels p2'(i,j). In a lossy compression scheme, these reconstructed pixels are not necessarily identical to the original pixels p2(i,j), representing the Type 2 patches that schematically reside in the second raster layer 420.

The decompression is performed block row by block row, each block row being 8 pixel row high. Only the last pixel row of the previous block row is needed for the copy and repeat of the lossless encoded data (the previous pixel row for the first block row is assumed to have values corresponding to no-ink paper).

Memory space is allocated for a complete block row. If the block row under reconstruction contains JPEG encoded blocks, the second decompressor decodes these blocks into their positions in the block row. The first decompressor 310 decodes the encoded data from the first compressed layer 210 row by row and pixel by pixel within each row. The Type 1 pixels p1(i,j) are decoded into their raster positions while transparent pixels t2(i,j) are replaced by the corresponding JPEG decoded pixels p2'(i,j). This is schematically represented by the AND gate 330 and the OR gate 340.

Alternative Preferred Embodiment

Figure 5:
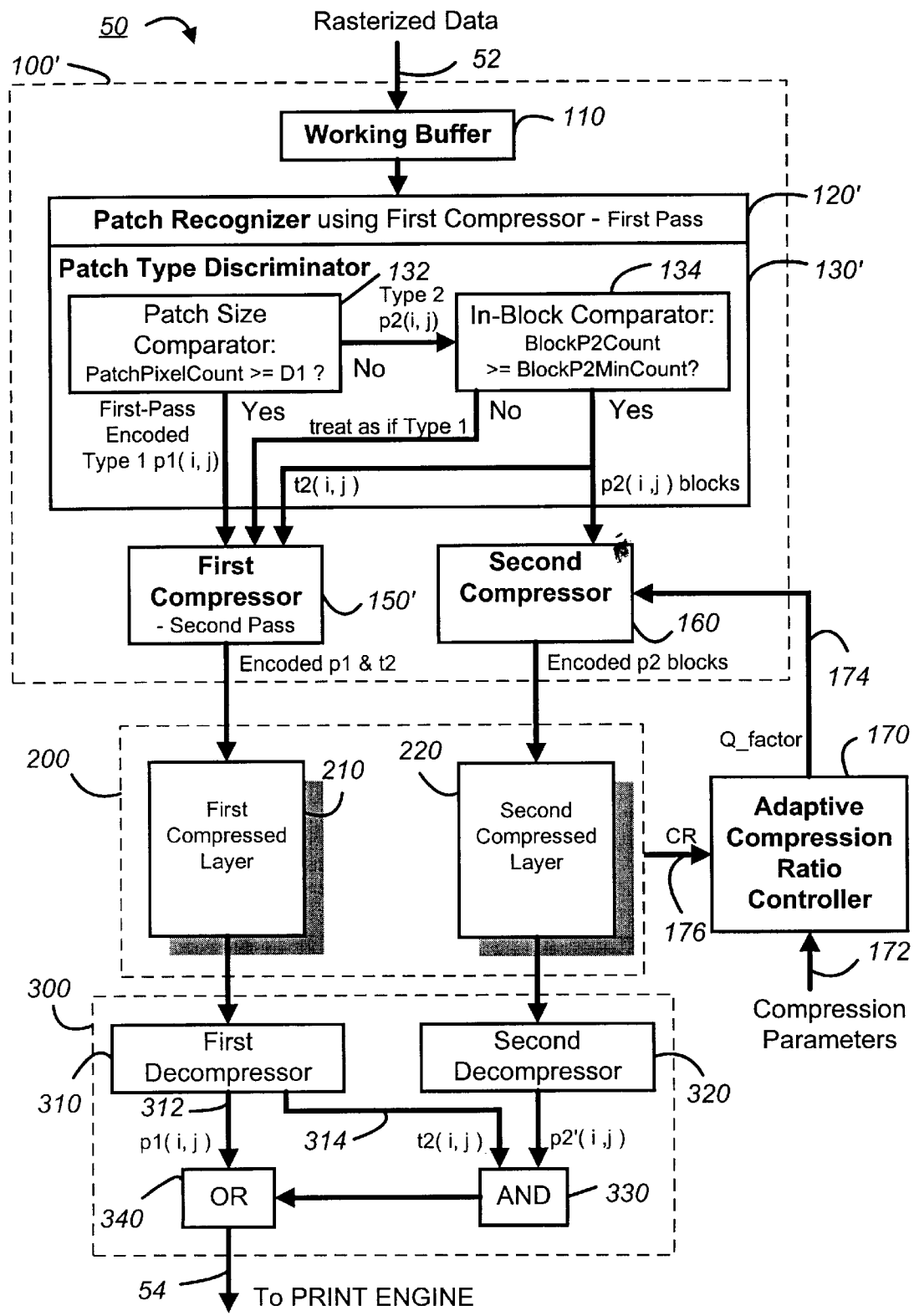
FIG. 5 is a block diagram of the apparatus and method of hybrid compression, according to another preferred embodiment of the invention.

FIG. 5 is a block diagram of the apparatus and method of hybrid compression, according to another preferred embodiment of the invention. A modified first compressor in two passes essentially applies lossless run-length encoding (RLE) to Type 1 data, and the second compressor 160 applies lossy JPEG encoding to Type 2 data.

Similar to the embodiment shown in FIG. 3, the generalized page memory 50 includes the compressor 100', the compressed page buffer 200 and the decompressor 300. The compressor 100' receives rasterized data strip by strip from the input 52 into a working buffer 110. The rasterized data is then processed by a patch recognizer 120', a patch type discriminator 130' and routed to either a first compressor 150' or a second compressor 160.

One feature in the alternative embodiment is that patch recognition and a first pass of the first compressor are integrated into the same process. The first pass of the first compressor (or patch recognizer 120') applies RLE to all raster data. Since the RLE represents a run or spread of pixels with the same color, patches are therefore identified as an integral part of the RLE process.

Thereafter, the patch type discriminator 130' sorts out the Type 1 and Type 2 patches. This is accomplished by a patch size comparator 132 and an in-block comparator 134. The patch size comparator 132 performs an initial separation of the Type 1 and Type 2 patches by virtue of whether each patch has its PatchPixelCount>=D1 or <D1. If PatchPixelCount >=D1, run-length encoded Type 1 pixels are routed to be processed by and second pass of the first compressor 150'. These Type 1 pixels will survive in a lossless form. If PatchPixelCount<D1, Type 2 pixels are slated for the second compressor 160. These pixels become candidates for lossy compression.

Another feature in the alternative embodiment is to set a threshold for JPEG compression of a block. If a block (8×8 pixels) has only a small number of Type 2 pixels, it will not be cost effective to perform the JPEG compression on that block. In a preferred implementation, the in-block comparator 134 performs a further screening of Type 2 pixels. It receives the Type 2 pixels directed from the patch size comparator 132 and determines the number of Type 2 pixels in individual JPEG blocks. If all Type 2 pixels in a JPEG block amount to a combined BlockP2Count<6 (approximately 10% of pixels of the block) they will be reclassified as Type 1 patches and be redirected to be processed by the second pass of the first compressor 150'. Otherwise, similar to the first embodiment, the Type 2 patches in the form of unencoded pixels p2(i,j) will be routed in individual JPEG blocks to the second compressor 160.

Similarly, the position information of the remaining Type 2 pixels is routed in the form of transparent pixels t2(i,j) to be compressed by the second pass of the first compressor 150'.

The second pass of the first compressor 150' essentially merges inputs from three sources. One is the first-pass encoded p1(i,j) from the patch size comparator. A second one is the initially Type 2 pixels that has been redirected as "Type 1" pixels by the in-block comparator 134. A third input is the transparent pixels t2(i,j) that are first run-length encoded by the second pass of the first compressor 150' before being merged with the other two inputs in the order these pixels appear on the document page.

FIG. 6 is a table listing a schedule of run-length codes according to a preferred embodiment of the invention. As before, a pixel as well as its color will be denoted by p(i,j) which is in column j of row i. A Type 1 pixel is denoted by p1(i,j) and a Type 2 pixel is denoted by p2(i,j) and its position is denoted by transparent pixel t2(i,j). It is being assumed that all pixels above p(i,j) (up to and including row i−1) and to its left (up to and including pixel j−1 in row i) were already encoded.

In the lossless encoding or decoding process it is assumed that the rasterized document is surrounded by no-ink paper. When a reference is being made to a pixel outside the document boundaries, its color is assumed "no-ink". The graphics layer is run-length encoded by repetition of the same color within the current row, copying segments of the previous row or a combination of the two. Special codes are being reserved to define new colors, either arbitrary colors (32-bit) or a limited number of palette colors (optional). The run length is either embedded in the code (a run length of 1, a single pixel of a color) or explicitly defined as short run length or long run length.

Essentially, each run-length code has the syntax of a 4-bit type-code that may be followed by a run-length parameter to encode from a single pixel p(i,j) to a run of pixels (R=run length) in row i. The run-length parameter can be short or long. A short run-length parameter is a 4-bit number. It represents runs of 2 to 16 pixels by values of 1 to 15, respectively (coded parameter value is actual run length minus one). A run of 17 pixels or longer is being represented by a long run-length parameter with 4-bit zero prefix followed by 16 bits of the actual run length (a total of 20 bits for this parameter).

Generally, a patch is identified during run-length encoding first by looking for a run along the current row (i.e. row patch) and then looking for possible connections of the row patch to adjacent patch of the same color in a previously encoded region.

More specifically, the document is being scanned row by row and pixel by pixel within each row and temporarily run-length (lossless) encoded. Associated with each NewColor code (i.e., start of a new run in a pixel row) is a row patch that may have from zero to a number of dependents (i.e., pixels of the same color which are related to the NewColor by copy and repeat codes.) If the row patch in the current pixel row is adjacent to another patch of the same color in a previously encoded region (i.e., to the left and/or above the row patch, they are coalesced to form a larger patch. In this way, patches are recognized by the patch recognizer 120' and their sizes in terms of the number of pixels in the patch are determined.

Figure 7:
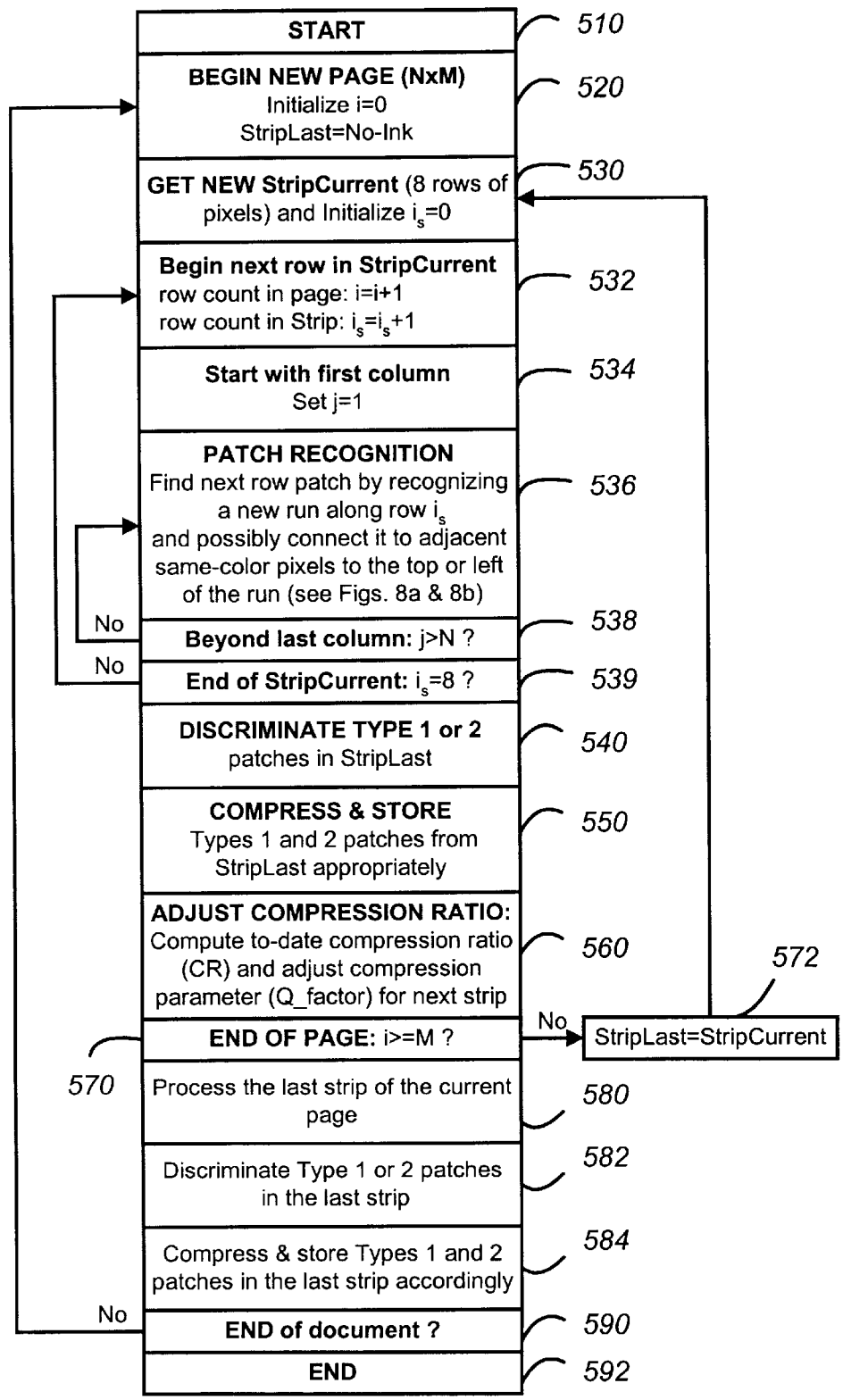
FIG. 7 is a flow diagram illustrating the sequence of compressing a document, according to a preferred embodiment of the present invention.

FIG. 7 is a flow diagram illustrating the sequence of compressing a document, according to a preferred embodiment of the present invention. The flow diagram is best understood in conjunction with the block diagram shown in FIG. 5.

Generally, a document is processed page by page, and within a page strip by strip, and within a strip row by row, and within a row pixel by pixel. A pixel located at the ith row and the jth column is denoted by p(i,j). A strip has 8 rows labeled by $i_s=1$ to 8. The strip currently being processed by the patch recognizer 120' will denoted by "StripCurrent", and a strip processed just prior to the current strip will be denoted by "StripLast".

The encoding process from recognition to type separation can be viewed as a horizontal window moving from top to bottom on the page in steps of a strip of 8 pixel rows (a JPEG block row height). The window height is at least 16 rows (i.e. at least 2 strip high). After the top strip (StripLast) has been temporarily encoded in the previous step, the decision for the final mix of encoding methods in the top block row is being delayed at least PatchP1MinCount (D1) rows beyond the end of StripLast to guarantee that all new color codes in the block row will be given the chance to defend themselves as well as their dependents. To simplify the process in the present implementation, an 8 row (one strip) delay was selected. The decision for a strip takes place at the end of the first pass of the first compressor of the next strip. This selection complies with the above stated delay as long as PatchP1MinCount is not greater than 8. Once the encoding of the StripLast is finalized, the present StripCurrent becomes StripLast and the window moves down by 8 rows exposing the next strip which will be the new StripCurrent.

In step 510, the sequence starts with a document to be compressed.

In step 520, a new raster page with an NxM array of pixels is being considered. Initially, set i=0 and all the pixels in StripLast to be no-ink.

In step 530, a new strip of raster data (StripCurrent) is retrieved into the working buffer 110.

In step 532, as the row count in the page and the row count in the strip is being incremented, the next row in the page is being considered.

In step 534, processing will begin from the first column by setting j=1.

In step 536, the patch recognizer 120' finds the next row patch by recognizing a new run along the current row and possibly connects it to adjacent pixels of the same color to the top or left of the run. Essentially, the patches existing in StripCurrent and possibly extending from StripLast are recognized. As part of the recognition process, run-length codes of the patches are also created. A more detailed sequence of patch recognition will be described later in connection with FIGS. 8a and 8b.

In step 538, if the next pixel is not beyond the page, i.e., j not greater than N, control is returned to step 536 to recognize the next run. If the last pixel in the row has been processed, control is advanced to step 539.

In step 539, control is returned to step 532 to process the next row in the strip until the last row is processed. Control is then advanced to step 540.

In step 540, the size of each patch recognized in both StripLast and StripCurrent is available. The patch type discriminator 130' examines only the patches existing fully or partially within StripLast and separates out the Type 1 and Type 2 patches and associated pixels both in encoded and unencoded forms.

In step 550, the first compressor in its second pass 150' encodes the transparent pixels and merges them with the encoded Type 1 pixels. The second compressor 160 compresses the Type 2 pixels block by block. In this way, the raster data in StripLast is separated into Types 1 and 2 which are then compressed and stored individually in the compressed page buffer 200. The compressed Type 1 data is stored in the first compressed layer 210, and the compressed Type 2 data is stored in the second compressed layer 220.

In step 560, with stripLast compressed, an updated compression ratio (CR) for the data compressed to-date is computed. As will be described in more detail later, an adaptive compression ratio controller 170 compares CR with a targeted compression ratio and adaptively adjusts a compression parameter, such as Q_factor in the second compressor that will affect the compression ratio beginning with the next strip (i.e., StripCurrent.)

In step 570, control is returned to step 530 via step 572 unless the end of page has been reached. In the latter case, control is advanced to step 580.

In step 572, since the data in StripLast has been compressed and stored in the compressed page buffer 200, and StripCurrent has been through the patch recognizer, the processed StripCurrent is replacing StripLast. Control is returned to step 530 to process a new StripCurrent.

In step 580, the last strip of the page as StripCurrent has been through the patch recognizer. As it is the last strip, it is subject to the patch size discriminator without the usual one-strip delay.

Thus, the following steps 582, 584 parallel steps 540 and 550 respectively.

In step 590, control is returned to step 520 to begin a new page until the end of document is reached. In the latter case, the compression process terminates in step 592.

Figure 8A:
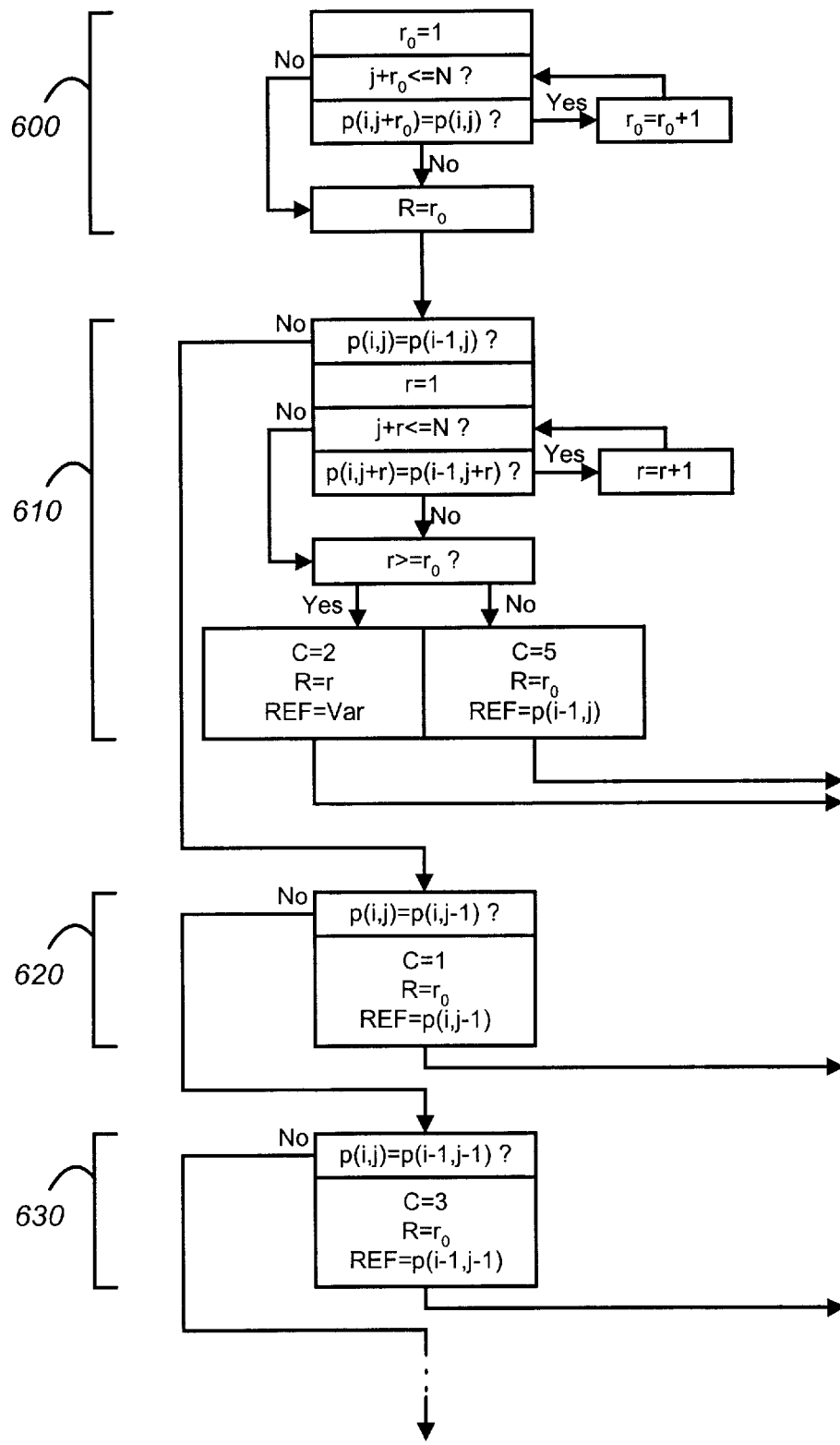
FIG. 8a shows a first portion of a flow diagram illustrating the procedure embodied in the first pass of the first compressor shown in FIG. 5 and FIG. 7.
Figure 8B:
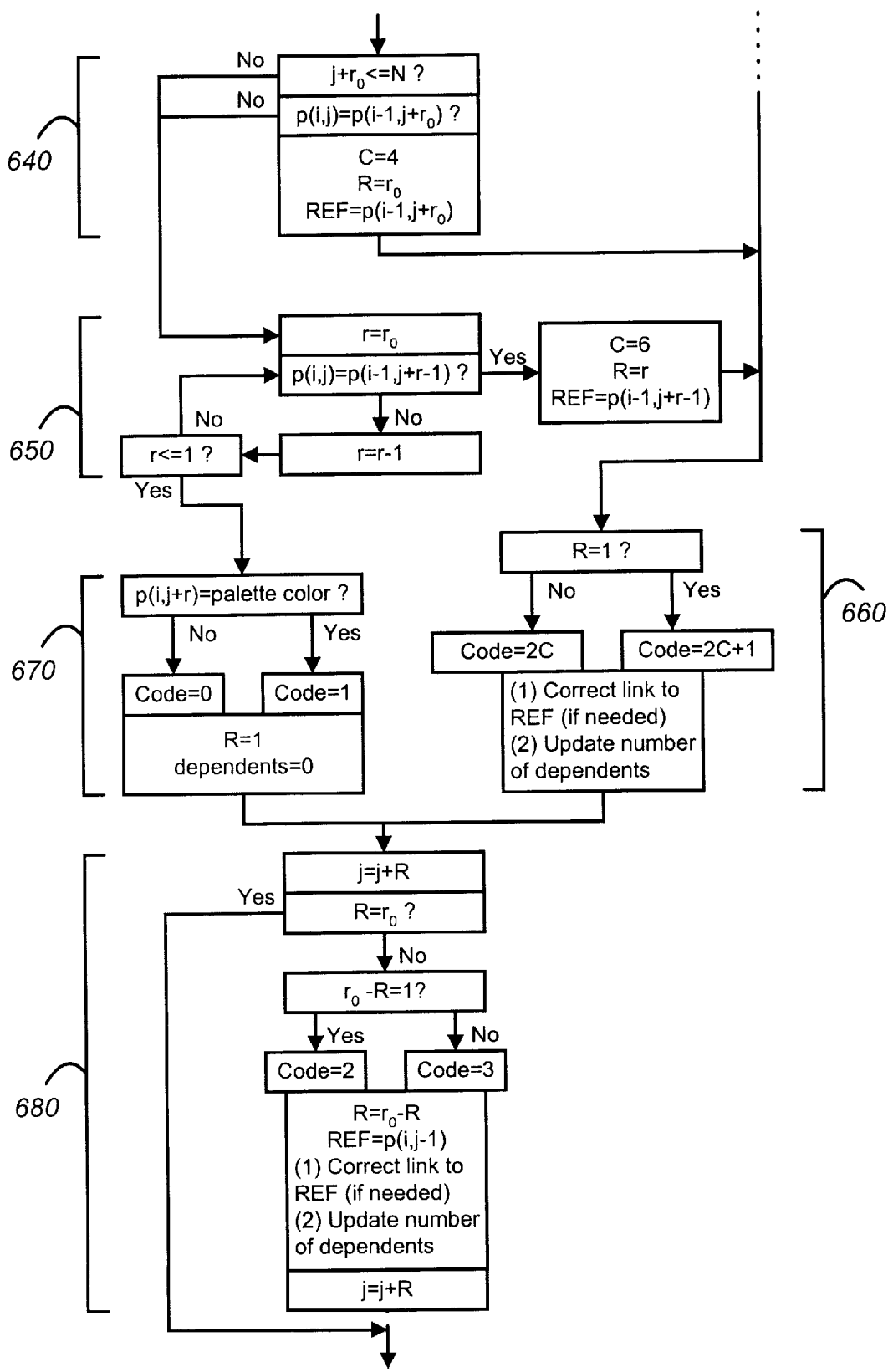

FIG. 8a is a first portion of a flow diagram illustrating the procedure embodied in the first pass of the first compressor shown in FIG. 5 and FIG. 7. FIG. 8b is a continuation of the flow diagram that begins in FIG. 8a.

The raster document is being scanned row by row and pixel by pixel within each row. It is assumed that rows 1 to i−1 of the raster page as well as pixels 1 to j−1 in row i were encoded already. Generally, each patch will have a New-Color pixel and a number of connected pixels of the same color ("dependents"). Each pixel p(i',j') in the already encoded section that is not defined as NewColor will have a pointer to a NewColor pixel which is the origin of a copy and repeat chain leading to p(i',j'). When a row patch is adjacent an already encoded patch, the row patch is coalesced to the existing patch by one of the run-length codes with respect to a reference pixel (REF) from the already encoded patch. This REF pixel, if not a NewColor pixel itself, has a pointer that points to the NewColor pixel of the patch.

The above procedure is described in detail in the following steps.

In step 600 a new search begins for the next row patch by checking the run to the right of column j. This determines $r_0$, the run length of pixels of the same color starting at position (i,j) and extending to the right of column j along row i, such that p(i,k)=p(i,j) for j<k<j+$r_0$. The Run length can be as small as 1 pixel or as large as N−j+1 pixels, where N is the number of pixels in a row.

In the following steps, adjacent pixels in the already encoded part of the document are being searched for matching the color of the current run length (row patch). If a match is found, the reference pixel (REF) is being marked and the current run length is encoded using one of the copy and repeat codes.

In step 610, if p(i,j)=p(i−1,j), code 11 is applicable, but not before more compact codes such as copying a segment of the previous row (code 4 or code 5) are first checked. Else control is passed onto step 620. Let p(i,k)=p(i−1,k) for j<k<j+r (obviously, r, the matched sequence on the previous row, is at least 1). If r>=$r_0$, the number of pixels that can be copied from the previous row is at least $r_0$, then update the run-length R=r, and set C=2 which means the run-length code will either be code 4 or code 5 (C is a variable that will later be converted in step 660 to either an even or odd code depending on whether the run-length R=1 or R>1) and each pixel p(i,k) will have its REF[p(i,k)]=p(i−1,k) for j<=k<j+r. Control is passed onto step 660.

If r<$r_0$, set C=5 (which means the run-length code will be code 11), R=$r_0$ and REF=p(i−1,j). Control is passed onto step 660.

In step 620, if p(i,j)=p(i,j−1), the pixel to the left of the run is checked (code 2 or 3), else control is passed onto step 630. If it has the same color, set C=1, R=$r_0$ and REF=p(i,j−1). Control is passed onto step 660.

In step 630, if p(i,j)=p(i−1,j−1), the pixel diagonally to the top left of the run is checked (code 6 or 7), else Control is passed onto step 640. If it has the same color, set C=3, R=$r_0$ and REF=p(i−1,j−1). Control is passed onto step 660.

In step 640, the pixel diagonally to the top right of the run is checked (code 8 or 9). If j+$r_0$<=N (i.e. column is not beyond the page), then if p(i,j)=p(i−1,j+$r_0$) set C=4, R=$r_0$ and the reference pixel REF=p(i−1,j+$r_0$), and control is passed onto step 660. Else, Control is passed onto step 650.

In step 650, set r=$r_0$ and find the furthest match on the previous row (code 13) by repeating the following cycle: if p(i,j)=p(i−1,j+r−1) then set C=6, R=r and REF=p(i−1,j+r−1) and then control is passed onto step 660, otherwise decrement r by 1 and if the new value r>1, cycle once more. Else, Control is passed onto step 670.

In step 660, a row patch beginning at p(i,j) has been found to match an adjacent pixel, set code=2*C when R=1 or code=2*C+1 otherwise. The reference pixel REF is examined. If it is marked with NewColor code, then R is being added to the count of its dependents. If the reference pixel REF is not a NewColor, then it has a pointer to the NewColor reference pixel of the patch. In this case, the REF is replaced by the NewColor and the count of dependents of the patch is updated. In the case of copying pixels from the previous row, which are not necessarily of a single color, each pixel falling under this code will be subject to the above procedure for its own reference pixel. Control is passed onto Step 680.

In step 670, the search for matching adjacent pixels has been unsuccessful, the run of $r_0$ pixels starting at p(i,j) cannot be linked to its neighbors. If p(i,j) matches a color from a palette of preselected colors, set code=1 with the palette index of the matching color as the parameter. Otherwise, p(i,j) will be defined as NewColor, code=0 with the full color representation as the parameter. In both cases, R=1 (only 1 pixel was coded in this mode) and the count of dependents for the newly defined new color is being set to zero. Control is passed onto step 680.

In step 680, at this point R pixels have been encoded by the first pass of the first compressor and the pixel pointer j is being updated to j+R, and if $R=r_0$, control returned to step 600 to process the next row patch.

In some cases the complete run length $r_0$ was not exhausted. If $r_0-R>0$, this leftover is encoded as a repetition in the current row with code=2 or 3, run length is $r_0-R$ and REF=p(i,j-1). Also, as in step 660, if REF is not a NewColor, its pointer is reset to a NewColor. Finally, j is incremented again, now by $r_0-R$. Control is returned to step 600 where the processing of the next run length will commence.

In this way, the first pass of the first compressor 120' encodes the document one row block at a time. All patches will be assigned run-length codes as listed in FIG. 6 whereupon its PatchPixelCount is easily determined.

Adaptive Compression Ratio Control

According to another aspect of the invention, during the compression procedures, the compression ratio achieved to-date is monitored after the completion of each row block and a set of compression parameters is adaptively changed in order to attain the required compression ratio for the whole document.

At the beginning of the encoding of a document, a desirable compression ratio ($CR_0$) is specified. Several adaptively adjusted parameters control the attainment of this goal. These parameters include (a) the PatchP1MinCount parameter, (b) the BlockP2MinCount parameter and (c) the Q_factor parameter applied to the quantization matrices in the JPEG encoding. The first two parameters control the relative proportions of the Type 1 and Type 2 compression procedures. In an implementation of the present invention, the first two parameters are fixed. Only the Q_factor parameter is allowed to change adaptively to maintain the best image quality within the required compression ratio.

In the JPEG encoding, the main source for reconstruction errors is the quantization of the DCT coefficients. A secondary (and usually negligible) source is the computational round-off errors. In an implementation of the current invention, 8 values were assigned to the Q-factor parameter (specified by a Q_level between 0 and 7, coded in 3 bits). When a Q_factor value is selected, it multiplies every element in the original quantization matrices to determine the present quantization matrices. The Q_factor values range from small to large values (0.25 to 2.0) which translates into fine to coarse quantization, low to high compression ratio or small to larger reconstruction errors, respectively.

Given the desirable compression ratio $CR_0$ for the document, an attempt is being made to maintain the instant compression ratio CR within a margin bounded by predetermined low and high limits defining a tolerance interval $[CR_L,CR_H]$. In an implementation of the present invention, the low and high limits of the interval were chosen as $CR_L=1.05*CR_0$ and $CR_H=1.10*CR_0$, respectively.

FIG. 5 shows an adaptive compression ratio controller 170 operating in cooperation with the second compressor 160 and the compressed page buffer 200. The compression ratio controller is preferable implemented as part of the microprocessor-based controller shown in FIG. 1. From an input 172, it receives compression parameters such as $CR_L$, $CR_H$, and definitions of the Q_factor values. In the preferred implementation, it serves to control the compression ratio of the second compressor 160 by adjusting the Q_factor via a feedback loop 174.

At the beginning of encoding a document the Q_factor is reset to its initial value, say the finest quantization (Q_level=0). At the end of encoding each block row, the compression ratio CR achieved to date is determined and fed via another input 176 to the adaptive compression ratio controller 170. This is the ratio between the number of bits required to represent the part of the original data from the top of the document to the end of the last encoded block row divided by the number of bits consumed for the compressed representation of this part.

A procedure embodied in the adaptive compression ratio controller adjusts the Q_factor accordingly. If $CR<CR_L$, the instant compression ratio is not good enough, then if Q_factor is not at its highest value, increase Q_factor to its next higher value and increment Q_level by 1. If $CR>CR_H$, the instant compression ratio is higher than required causing larger errors than necessary in the lossy encoding, then if Q_factor is not at its lowest value, decrease Q_factor to its next lower value and decrement Q_level by 1. If CR is within limits of the tolerance interval, no adjustment is required. Compression will resume with the current Q_factor until further adjustment is called for.

Even when the instant compression ratio is higher than required, no attempt is made to unconditionally apply lossless compression all areas of the document. Photographic image data will still be JPEG encoded, though the Q_factor will be small yielding very high quality reconstruction.

Fall Back Procedure

According to another aspect of the invention, a recompression procedure is implemented in the rare event that the required compression ratio is not attained. The encoding procedure described above will generally obtain reasonably required compression ratio for most documents. However, this target is not always guaranteed with an optimum set of parameters. In this event, the assigned storage will be consumed before the end of the document is reached. At this point the original data for the part of the document that was already compressed is most probably not available.

The parameters that can be adjusted to increase the compression ratio are: PatchP1MinCount; BlockP2MinCount; and the range of values of Q_factor. Increasing PatchP1MinCount and decreasing BlockP2MinCount will push lossless encoded patches into the lossy mode. Coarsening the values of the Q_factor parameter will increase the compression ratio of the JPEG encoded portion of the document.

Applying the concept of the moving window, the compressed part of the document will be gradually decoded (using the previous set of parameters) and recompressed (using the updated set of parameters). If there is no change in the assignment of lossless/lossy pixels, a shortcut can be taken for a JPEG encoded block but the block has to be recompressed with a higher Q_factor. This block is entropy decoded, the quantized coefficients are multiplied by the ratio old(Q_factor)/new(Q_factor) and once again entropy coded.

While the embodiments of the various aspects of the present invention that have been described are the preferred implementation, those skilled in the art will understand that variation thereof may also be possible. The device and method described therein are applicable to compression of raster data in general. Therefore, the invention is entitled to protection within the full scope of the appended claims.

It is claimed:

1. An apparatus for hybrid compression of raster data, said raster data being an array of pixels with each pixel representing a color at a position in the array, comprising:
   a first storage for buffering subarrays of the array of pixels;
   a patch recognizer operating on individual subarrays and recognizing patches of connected pixels of the same color therein, each patch having a determinable number of pixels;
   a patch type discriminator separating individual patches into either a first type patch or a second type patch, depending respectively on whether or not the number of pixels in a patch is at least of a predetermined number;
   a first compressor employing a first encoding procedure to encode pixels of the first type patches into encoded data of a first type; and
   a second compressor employing a second encoding procedure to encode pixels of the second type patches into encoded data of a second type,
   thereby allowing the encoded data of the first and second types to be stored in a storage in compressed form, and to be decodeable substantially by inverting the respective encoding procedures to obtain reconstructed pixels of said array.

2. An apparatus for hybrid compression of raster data as in claim 1, wherein:
   said first encoding procedure is a lossless encoding; and
   said second encoding procedure is a lossy encoding.

3. An apparatus for hybrid compression of raster data as in claim 1, wherein said first encoding procedure includes a run-length encoding.

4. An apparatus for hybrid compression of raster data as in claim 1, wherein said second encoding procedure includes a transform encoding.

5. An apparatus for hybrid compression of raster data as in claim 1, further comprising:
   an adaptive controller that monitors a compression ratio attained by said apparatus at predetermined instants, said compression ratio being given by the number of bits required to store the portion of raster data that has been subject to encoding to date divided by the number of bits required to store the corresponding encoded raster data,
   said adaptive controller, in a given instant responsive to a comparison between a compression ratio monitored and a targeted compression ratio, adaptively adjusting one or more compression parameters affecting the compression of said second compression procedure for meeting the targeted compression ratio.

6. An apparatus for hybrid compression of raster data as in claim 1, wherein said apparatus is responsive to a set of compression parameters for attaining a given compression ratio, said compression ratio being given by the number of bits required to store the raster data divided by the number of bits required to store the encoded raster data, said apparatus further comprising:
   a recompression controller, responsive to an indication that a currently attained compression ratio not meeting a targeted compression ratio, for allowing the encoded raster data to be decoded to the raster data, and allowing said apparatus to recompress the raster data with another set of compression parameters that produces a higher compression ratio than said currently attained.

7. An apparatus for hybrid compression of raster data as in claim 6, wherein the set of compression parameters includes the predetermined number associated with the number of pixels in a patch.

8. An apparatus for hybrid compression of raster data as in claim 1, wherein:
   said first encoding procedure includes a run-length encoding; and
   said second encoding procedure includes a transform encoding that operates on a plurality of blocks to form transform encoded data, each block being a predefined matrix of pixels of the array.

9. An apparatus for hybrid compression of raster data as in claim 8, wherein the transform encoding is a JPEG encoding that operates on a plurality of blocks to form JPEG encoded data, each block being an 8×8 pixel block of the array.

10. An apparatus for hybrid compression of raster data as in claim 8, wherein said patch type discriminator further includes an in-block counter that determines whether or not it is true that a block contains at least a predetermined threshold number of pixels of the second type patches, and if not true, reclassifies and separates these pixels as belonging to the first type patches.

11. An apparatus for hybrid compression of raster data as in claim 8, wherein for a block that is partially filled with pixels of the second type patches, said block's complement pixels individually have a color value substantially given by averaging the color values of said pixels partially filling the block.

12. An apparatus for hybrid compression of raster data as in claim 8, wherein:
   said patch type discriminator also generates position tags associated with pixels of the second type patches, said position tags being directed to said first compressor to be encoded by the first encoding procedure; and
   such that when the encoded data of the first and second type are decoded into reconstructed pixels, the raster data is reconstructed from those reconstructed pixels of the first type patches and those reconstructed pixels of the second type patches having associated position tags.

13. An apparatus for hybrid compression of raster data as in claim 9, wherein:
   said patch type discriminator also generates position tags associated with pixels of the second type patches, said position tags being directed to said first compressor to be encoded by the first encoding procedure; and
   such that when the encoded data of the first and second type are decoded into reconstructed pixels, the raster data is reconstructed from those reconstructed pixels of the first type patches and those reconstructed pixels of the second type patches having associated position tags.

14. An apparatus for hybrid compression of raster data as in any one of claims 1 to 13, wherein said apparatus employs a first pass of said first compressor to serve also as said patch recognizer such that said first pass of said first compressor recognizes patches of connected pixels of the same color and also encodes first type patches during the recognition.

15. An apparatus for hybrid compression and decompression of raster data, said raster data being an array of pixels with each pixel representing a color at a position in the array, comprising:

a first storage for buffering subarrays of the array of pixels;

a patch recognizer operating on individual subarrays and recognizing patches of connected pixels of the same color therein, each patch having a determinable number of pixels;

a patch type discriminator separating individual patches into either a first type patch or a second type patch, depending respectively on whether or not the number of pixels in a patch is at least of a predetermined number;

a first compressor employing a first encoding procedure to encode pixels of the first type patches into encoded data of a first type; and a second compressor employing a second encoding procedure to encode pixels of the second type patches into encoded data of a second type;

a second storage for storing the encoded data of the first and second types; and first and second decompressors coupled to said second storage for respectively decoding the encoded data of the first and second types into corresponding pixels of said array to reconstruct the raster data.

16. An apparatus for hybrid compression and decompression of raster data as in claim 15, wherein:

said first decompressor decodes encoded data of the first type into reconstructed pixels of a first type and position tags associated with pixels of a second type; and said second decompressor decodes encoded data of a second type into reconstructed pixels of the second type, such that those reconstructed pixels of the first type and those reconstructed pixels of the second type having an associated position tag are decoded into their respective positions in the array to reconstruct the raster data.

17. An apparatus for hybrid compression and decompression of raster data as in claim 15, wherein:

said first encoding procedure is a lossless encoding; and
said second encoding procedure is a lossy encoding.

18. An apparatus for hybrid compression and decompression of raster data as in claim 15, wherein said first encoding procedure includes a run-length encoding.

19. An apparatus for hybrid compression and decompression of raster data as in claim 15, wherein said second encoding procedure includes a transform encoding.

20. An apparatus for hybrid compression and decompression of raster data as in claim 15, further comprising:

an adaptive controller that monitors a compression ratio attained by said apparatus at predetermined instants, said compression ratio being given by the number of bits required to store the portion of raster data that has been subject to encoding to date divided by the number of bits required to store the corresponding encoded raster data, said adaptive controller, in a given instant responsive to a comparison between a compression ratio monitored and a targeted compression ratio, adaptively adjusting one or more compression parameters affecting the compression of said second compression procedure for meeting the targeted compression ratio.

21. An apparatus for hybrid compression and decompression of raster data as in claim 15, wherein said apparatus is responsive to a set of compression parameters for attaining a given compression ratio, said compression ratio being given by the number of bits required to store the raster data divided by the number of bits required to store the encoded raster data, said apparatus further comprising:

a recompression controller, responsive to an indication that a currently attained compression ratio not meeting a targeted compression ratio, for allowing the encoded raster data to be decoded to the raster data, and allowing said apparatus to recompress the raster data with another set of compression parameters that produces a higher compression ratio than said currently attained.

22. An apparatus for hybrid compression and decompression of raster data as in claim 21, wherein the set of compression parameters includes the predetermined number associated with the number of pixels in a patch.

23. An apparatus for hybrid compression and decompression of raster data as in claim 15, wherein:

said first encoding procedure includes a run-length encoding; and said second encoding procedure includes a transform encoding that operates on a plurality of blocks to form transform encoded data, each block being a predefined matrix of pixels of the array.

24. An apparatus for hybrid compression and decompression of raster data as in claim 23, wherein the transform encoding is a JPEG encoding that operates on a plurality of blocks to form JPEG encoded data, each block being an 8×8 pixel block of the array.

25. An apparatus for hybrid compression and decompression of raster data as in claim 23, wherein said patch type discriminator further includes an in-block counter that determines whether or not it is true that a block contains at least a predetermined threshold number of pixels of the second type patches, and if not true, reclassifies and separates these pixels as belonging to the first type patches.

26. An apparatus for hybrid compression and decompression of raster data as in claim 23, wherein for a block that is partially filled with pixels of the second type patches, said block's complement pixels individually have a color value substantially given by averaging the color values of said pixels partially filling the block.

27. An apparatus for hybrid compression and decompression of raster data as in claim 23, wherein:

said patch type discriminator also generates position tags associated with pixels of the second type patches, said position tags being directed to said first compressor to be encoded by the first encoding procedure; and such that when the encoded data of the first and second type are decoded into reconstructed pixels, the raster data is reconstructed from those reconstructed pixels of the first type patches and those reconstructed pixels of the second type patches having associated position tags.

28. An apparatus for hybrid compression and decompression of raster data as in claim 24, wherein:

said patch type discriminator also generates position tags associated with pixels of the second type patches, said position tags being directed to said first compressor to be encoded by the first encoding procedure; and such that when the encoded data of the first and second type are decoded into reconstructed pixels, the raster data is reconstructed from those reconstructed pixels of the first type patches and those reconstructed pixels of the second type patches having associated position tags.

29. An apparatus for hybrid compression and decompression of raster data as in any one of claims 15 to 28, wherein said apparatus employs a first pass of said first compressor to serve also as said patch recognizer such that said first pass of said first compressor recognizes patches of connected pixels of the same color and also encodes first type patches during the recognition.

30. A method for hybrid compression of raster data, said raster data being an array of pixels with each pixel representing a color at a position in the array, comprising:

identifying patches of connected pixels of the same color;

discriminating whether each patch has a size that belongs to a first or second type, wherein a patch of said first type contains pixels of at least a predetermined number and a patch of said second type contains pixels less than said predetermined number;

encoding patches belonging to said first type by a first compression procedure; and encoding patches belonging to said second type by a second compression procedure.

31. A method for hybrid compression of raster data as in claim 30, wherein:

said first encoding procedure is a lossless encoding; and said second encoding procedure is a lossy encoding.

32. A method for hybrid compression of raster data as in claim 30, wherein said first encoding procedure includes a run-length encoding.

33. A method for hybrid compression of raster data as in claim 30, wherein second encoding procedure includes a transform encoding.

34. A method for hybrid compression of raster data as in claim 30, wherein said predetermined number is such that the raster page is compressed preferentially by said first compression procedure while attaining at least a targeted compression ratio.

35. A method for hybrid compression of raster data as in claim 30, further comprising:

monitoring a compression ratio attained by said method at predetermined instants, said compression ratio being given by the number of bits required to store the portion of raster data that has been subject to encoding to date divided by the number of bits required to store the corresponding encoded raster data, responsive to a comparison between a compression ratio monitored and a targeted compression ratio in a given instant, adaptively adjusting one or more compression parameters affecting the compression of said second compression procedure for meeting the targeted compression ratio.

36. A method for hybrid compression of raster data as in claim 30, wherein said method is responsive to a set of compression parameters for attaining a given compression ratio, said compression ratio being given by the number of bits required to store the raster data divided by the number of bits required to store the encoded raster data, said method further comprising:

responsive to an indication that a currently attained compression ratio not meeting a targeted compression ratio, decoding the encoded raster data to the raster data, and recompressing the raster data with another set of compression parameters that produces a higher compression ratio than said currently attained.

37. A method for hybrid compression of raster data as in claim 36, wherein the set of compression parameters includes the predetermined number associated with the number of pixels in a patch.

38. A method for hybrid compression of raster data as in claim 30, wherein:

said first encoding procedure includes a run-length encoding; and said second encoding procedure includes a transform encoding that operates on a plurality of blocks to form transform encoded data, each block being a predefined matrix of pixels of the array.

39. A method for hybrid compression of raster data as in claim 38, wherein the transform encoding is a JPEG encoding that operates on a plurality of blocks to form JPEG encoded data, each block being an 8×8 pixel block of the array.

40. A method for hybrid compression of raster data as in claim 38, wherein said patch discriminating step further includes determining whether or not it is true that a block contains at least a predetermined threshold number of pixels of the second type patches, and if not true, reclassifying and separating these pixels as belonging to the first type patches.

41. A method for hybrid compression of raster data as in claim 38, wherein for a block that is partially filled with pixels of the second type patches, said block's complement pixels individually have a color value substantially given by averaging the color values of said pixels partially filling the block.

42. A method for hybrid compression of raster data as in claim 38, wherein:

said patch discriminating step includes generating position tags associated with pixels of the second type patches, said position tags being directed to said first compressor to be encoded by the first encoding procedure; and such that when the encoded data of the first and second type are decoded into reconstructed pixels, the raster data is reconstructed from those reconstructed pixels of the first type patches and those reconstructed pixels of the second type patches having associated position tags.

43. A method for hybrid compression of raster data as in claim 39, wherein:

said patch discriminating step includes generating position tags associated with pixels of the second type patches, said position tags being directed to said first compressor to be encoded by the first encoding procedure; and such that when the encoded data of the first and second type are decoded into reconstructed pixels, the raster data is reconstructed from those reconstructed pixels of the first type patches and those reconstructed pixels of the second type patches having associated position tags.

44. A method for hybrid compression of raster data as in any one of claims 30 to 43, wherein said method employs a first pass of said first compressing procedure to identify patches of connected pixels of the same color and also to encode first type patches during the identifying of patches.

45. A method for hybrid compression of raster data as in claim 30, further comprising:

providing first and second layers of raster data that individually have a corresponding array of pixels as the raster data;

assigning to said first layer pixels from patches belonging to said first type and associated position tags corresponding to pixels from patches belonging to said second type;

assigning to said second layer pixels from patches belonging to said second type to said second layer; and forming a representation of the raster data by superposition of first and second layers of raster data; and applying said first compression procedure to said first layer and said second compression procedure to said second layer.

46. A method for hybrid compression and decompression of raster data, said raster data being an array of pixels with each pixel representing a color at a position in the array, comprising:

buffering subarrays of the array of pixels in a first storage;

identifying in individual subarrays patches of connected pixels of the same color, each patch having a determinable number of pixels;

discriminating and separating individual patches into either a first type patch or a second type patch, depending respectively on whether or not the number of pixels in a patch is at least of a predetermined number;

employing a first encoding procedure to encode pixels of the first type patches into encoded data of a first type; and employing a second encoding procedure to encode pixels of the second type patches into encoded data of a second type;

storing the encoded data of the first and second types in a second storage; and decoding the encoded data of the first and second types in the second storage into corresponding pixels of said array to reconstruct the raster data.

47. A method for hybrid compression and decompression of raster data as in claim 46, wherein:

the encoded data of the first type is decoded into reconstructed pixels of a first type and position tags associated with pixels of a second type; and the encoded data of a second type is decoded into reconstructed pixels of the second type, such that those reconstructed pixels of the first type and those reconstructed pixels of the second type having an associated position tag are decoded into their respective positions in the array to reconstruct the raster data.

48. A method for hybrid compression and decompression of raster data as in claim 46, wherein:

said first encoding procedure is a lossless encoding; and
said second encoding procedure is a lossy encoding.

49. A method for hybrid compression and decompression of raster data as in claim 46, wherein said first encoding procedure includes a run-length encoding.

50. A method for hybrid compression and decompression of raster data as in claim 46, wherein said second encoding procedure includes a transform encoding.

51. A method for hybrid compression and decompression of raster data as in claim 46, further comprising:

monitoring a compression ratio attained by said method at predetermined instants, said compression ratio being given by the number of bits required to store the portion of raster data that has been subject to encoding to date divided by the number of bits required to store the corresponding encoded raster data, responsive to a comparison between a compression ratio monitored and a targeted compression ratio in a given instant, adaptively adjusting one or more compression parameters affecting the compression of said second compression procedure for meeting the targeted compression ratio.

52. A method for hybrid compression and decompression of raster data as in claim 46, wherein said method is responsive to a set of compression parameters for attaining a given compression ratio, said compression ratio being given by the number of bits required to store the raster data divided by the number of bits required to store the encoded raster data, said method further comprising:

responsive to an indication that a currently attained compression ratio not meeting a targeted compression ratio, decoding the encoded raster data to the raster data, and recompressing the raster data with another set of compression parameters that produces a higher compression ratio than said currently attained.

53. A method for hybrid compression and decompression of raster data as in claim 52, wherein the set of compression parameters includes the predetermined number associated with the number of pixels in a patch.

54. A method for hybrid compression and decompression of raster data as in claim 46, wherein:

said first encoding procedure includes a run-length encoding; and said second encoding procedure includes a transform encoding that operates on a plurality of blocks to form transform encoded data, each block being a predefined matrix of pixels of the array.

55. A method for hybrid compression and decompression of raster data as in claim 54, wherein the transform encoding is a JPEG encoding that operates on a plurality of blocks to form JPEG encoded data, each block being an 8×8 pixel block of the array.

56. A method for hybrid compression and decompression of raster data as in claim 54, wherein said patch discriminating step further includes determining whether or not it is true that a block contains at least a predetermined threshold number of pixels of the second type patches, and if not true, reclassifying and separating these pixels as belonging to the first type patches.

57. A method for hybrid compression and decompression of raster data as in claim 54, wherein for a block that is partially filled with pixels of the second type patches, said block's complement pixels individually have a color value substantially given by averaging the color values of said pixels partially filling the block.

58. A method for hybrid compression and decompression of raster data as in claim 54, wherein:

said patch discriminating step includes generating position tags associated with pixels of the second type patches, said position tags being directed to said first compressor to be encoded by the first encoding procedure; and such that when the encoded data of the first and second type are decoded into reconstructed pixels, the raster data is reconstructed from those reconstructed pixels of the first type patches and those reconstructed pixels of the second type patches having associated position tags.

59. A method for hybrid compression and decompression of raster data as in claim 55, wherein:

said patch discriminating step includes generating position tags associated with pixels of the second type patches, said position tags being directed to said first compressor to be encoded by the first encoding procedure; and such that when the encoded data of the first and second type are decoded into reconstructed pixels, the raster data is reconstructed from those reconstructed pixels of the first type patches and those reconstructed pixels of the second type patches having associated position tags.

60. A method for hybrid compression and decompression of raster data as in any one of claims 46 to 59, wherein said method employs a first pass of said first compressing procedure to identify patches of connected pixels of the same color and also to encode first type patches during the identifying of patches.

* * * * *